United States Patent [19]

Schwartz et al.

[11] 3,771,950

[45] Nov. 13, 1973

[54] PROCESS FOR PREPARING PERMANENT-PRESS ARTICLES

[75] Inventors: Anthony Max Schwartz; Julian Berch, both of Washington, D.C.

[73] Assignee: The Gillette Company Research Institute, Rockville, Md.

[22] Filed: May 26, 1967

[21] Appl. No.: 641,476

[52] U.S. Cl. .................... 8/115.5, 8/115.7, 8/181, 8/185, 8/186
[51] Int. Cl. .................... D06m 13/14, D06m 13/34
[58] Field of Search .................. 8/116.3, 142, 115.5; 260/33.8

[56] References Cited
UNITED STATES PATENTS

| | | | |
|---|---|---|---|
| 2,248,696 | 7/1941 | Cassel | 8/18 X |
| 2,277,747 | 3/1942 | Dreyfus | 8/131 X |
| 1,361,277 | 10/1944 | Enderlin et al. | 8/62 X |
| 2,409,906 | 10/1946 | Scott | 260/856 X |
| 3,057,748 | 10/1962 | Staubly et al. | 8/142 X |
| 3,163,493 | 12/1964 | Hess | 8/142 |
| 3,148,164 | 9/1964 | Enders et al. | 117/145 X |
| 3,565,846 | 2/1971 | Enders et al. | 117/139.4 X |

FOREIGN PATENTS OR APPLICATIONS

| | | | |
|---|---|---|---|
| 1,174,859 | 3/1959 | France | 8/116.3 |
| 242,096 | 8/1965 | Austria | 8/116.3 |

OTHER PUBLICATIONS

Alan, "Solvent Applications of Chemicals to Textile Materials", American Dyestuff Reporter, Vol. 55, Dec. 19. 1966, pages 1113–1115.
Graham et al., "The Application of Resin Finishes to Cotton Garments Using Drycleaning Plant Equipment," Textile Research Journal, 1958, Vol. 28, pages 252–256.

Primary Examiner—Norman G. Torchin
Assistant Examiner—John R. Miller, Jr.
Attorney—R. W. Furlong

[57] ABSTRACT

In the process of making permanent-press articles, treating the article with a liquid impregnating composition having at least two phases, containing liquid droplets of a water solution of thermosetting resin and catalyst dispersed in a water immiscible organic liquid which has a higher evaporation rate than water at room temperature.

11 Claims, No Drawings

PROCESS FOR PREPARING PERMANENT-PRESS ARTICLES

This invention relates to a process for preparing permanent-press articles. More particularly, the invention relates to the use of a liquid composition comprising at least two phases, to impregnate fabric containing hydrophilic textile fibers with permanent-press producing resinous materials.

In the usual preparation of permanent-press articles, the fabric is first treated with an appropriate resin (typically a methylol aminoplast type), a catalyst necessary for curing (for example, zinc nitrate), and various softeners and other adjuvants necessary to produce a satisfactory final fabric, all typically contained in a liquid treatment bath. These materials are customarily applied to the fabric in long lengths prior to cutting it to the desired patterns. When the fabric is treated in such large lots of uniform dimensions, the amount of resin absorbed by the fabric can readily be controlled (e.g. through the use of squeeze rolls). The article is then fabricated, and pressed (typically by hand) into the desired shape; this shape is permanently fixed by heating the articles at high temperature, thereby curing the resin.

However, in some operations such as, for example, the custom tailoring of garments, it may be preferred to fabricate the article into the desired pattern prior to subjecting the fabric to the treatment bath. The article is thereafter subjected to the treatment bath, typically in some sort of immersion-agitating device. One serious disadvantage of this method, however, has been that, because the usual treatment bath contains the resinous and other material in aqueous solution, and such large excess of this aqueous composition must be used to treat the articles, the drying time of the articles so treated has been excessively long. This drying time is further aggravated by the complex shape of the articles, such as garments, to be dried and the comparatively low temperatures at which this drying must be carried out to avoid pre-curing the resin (and hence imparting an undesirable permanent shape to the article). Additionally, the various fabric thicknesses found in garments (e.g., pockets, etc.) results in some parts drying more slowly than others, which, when the overall drying time is lengthy, may result in overdrying and hence premature fixation in an undesired shape of some areas.

It is one object of this invention to provide a method for applying appropriate resinous impregnating material to articles which are to have a permanent press, which will afford rapid drying of the treated article.

Another object of this invention is to provide an impregnating composition and method of applying it to articles which are to have a permanent press which will assure a uniform resin add-on within controllable limits.

The invention features an impregnating bath consisting of a liquid impregnating composition, comprising at least two phases, and containing liquid droplets of a water solution of a thermosetting resin and a catalyst therefor dispersed in a water immiscible organic liquid, the volume of organic liquid being at least twice the volume of water solution. The water immiscible organic liquid must have an evaporation rate at room temperature greater than that of water, and the organic liquid will preferably be one in which said resin and catalyst are substantially insoluble. The fabric to be treated preferably contains an amount of hydrophilic textile fibers at least as great as the amount required to absorb all of said water solution. Typically, the liquid impregnating composition may be prepared immediately before use.

In a preferred embodiment, the liquid impregnating composition contains at least two phases; in the water solution phase, there is contained a resin and catalyst the application of which, in combination with appropriate softeners and other adjuvants, to a fabric containing hydrophilic textile fibers, will, upon curing of said resin, result in a "permanent-press" article. The softeners and other adjuvants would typically be suspended or emulsified in the water immiscible organic liquid, in a manner similar to the water solution phase. The preferred resin is of the methylol aminoplast type, including for example, the dimethylol carbamates (methyl, methoxyethyl, isopropyl, ethyl or hydroxyethyl), the ureas (dimethylolethylene, dimethylolpropylene, dimethylol dihydroxy ethylene, mono-, di-, or trimethylol, mono-, di-, or trimethoxymethyl), dimethylol ethyl triazone, triazine (melamine-formaldehyde plus dimethoxymethyl uron), the methylated mono-, di-, and trimethylol melamines, and dimethylol hexahydropyrimidinone (DMHP). Among the catalysts suitable for such resins are zinc nitrate, zinc chloride, magnesium chloride, alkanolamine hydrochlorides, such as monoethanolamine, diethanolamine, or monoisopropanolamine hydrochloride, and dimethylamino methylpropanol hydrochloride. Both resin and catalyst must be water soluble, and preferably substantially insoluble in the organic liquid selected. The softener which may be used depends on the desired characteristics of the finished fabric: preferably, the softener is a "latex" (concentrated aqueous dispersion) of a very finely divided polyethylene; a typical suitable commercial softener is Mykon SF polyethylene softener, but other suitable softeners will be apparent to those skilled in the art. The relative proportions of ingredients in the aqueous phase may vary, as is well known in the art, depending on the particular ingredients selected and the particular fabric to be treated. Generally, resin solids in the range of 3–15% of fabric weight, catalyst solids in the range of 2–20% of resin solids weight, and softener solids in the range of 0–15% of fabric weight are used.

The amount of water in the aqueous phase should be kept relatively low, insuring a quick drying time. Minimally, the water should preferably be present in sufficient quantity such that all the resinous and catalytic materials will be in liquid solution. Preferably the amount of water solution should not be substantially lower than the natural moisture regain of the hydrophilic fibers of the fabric (typically in the range of 10–15% of garment weight). Where the fabric has been dried to a moisture regain lower than the equilibrium saturation value, depending on the natural moisture regain of the fabric, up to 35% (on weight of fabric) additional water, over and above what is normally present in commercial resin and catalyst preparations, may have to be added to insure optimum performance.

The water immiscible organic liquid, which comprises the second phase, must have an evaporation rate at room temperature greater than that of water and preferably be one in which neither resin nor catalyst is substantially soluble. The substantial insolubility of resin insures that the amount of resin added will be confined almost entirely to the aqueous phase, and hence will be ultimately deposited almost entirely on the garment, affording precise add-on control. However, even where the resin is soluble in the organic liquid, resin deposit can still be controlled according to the present invention if the organic liquid is saturated with resin, prior to adding the water solution phase. The tolerable solubility then would depend solely on the economic factors of how much resin might economically be used to presaturate the organic phase. Where necessary, the organic liquid may also be similarly presaturated with catalyst and water.

Some examples of such organic liquids are: perchloroethylene, trichloroethylene, carbon tetrachloride, "Varsol" (petroleum naphthas boiling between 300° and 400° F) and "Stoddard Solvent". A surfactant or organic emulsifier, such as isopropylamine dodecyl benzene sulfonate (Atlas G-711), is also added to the organic liquid, to give the emulsion required to assure adequate and more precise resin deposit on the fabric.

A suitable amount of surfactant serves to keep the aqueous phase in the form of uniformly distributed small droplets while it is being deposited on the fabric, thus assuring uniform resin add-on. Without the surfactant, vigorous and constant agitation would be necessary to maintain the uniform droplet dispersion. Preferably, the surfactant is present in a quantity sufficient to give an unstable suspension-like emulsion, which allows the aqueous droplets to break out of their nonliquid surroundings upon contact with the fabric. This surfactant, being of the type which promotes water-in-oil emulsification, will therefore be soluble in the organic liquid and preferably substantially insoluble in water. Some solubility is tolerable, however, since owing to the much greater volume of the organic liquid phase, only a relatively small amount of surfactant will deposit with the aqueous layer on the fabric.

Generally, any long chain organic compound, which is soluble in the water immiscible organic liquid chosen, and capable of promoting formation of water-in-oil emulsions, and which belongs to any of the classes of compounds known to those skilled in the art as drycleaning detergents, is suitable. Preferably, the emulsifier used will be selected from the group consisting of petroleum sulfonates, long chain phosphate esters (e.g., the exthoxylated phosphate esters), sodium sulfosuccinates, sodium alkylarenesulfonates, amine alkylarene-sulfonates, ethoxylated alkanolamides, ethoxylated phenols, soap-fatty acid mixtures, and fatty acid esters of sorbitan and similar carbohydrates.

The organic liquid must be present in sufficient amount to insure complete wetting of the garment during the treatment procedure; anywhere from 500 to 2,000% organic liquid on fabric weight may be used. The emulsifier is present in amounts ranging from 0.1 to 5% of the organic liquid weight.

According to a preferred embodiment, the article is treated with the liquid impregnating composition by tumbling the article in a tank containing the composition. One such apparatus is a conventional dry-cleaning apparatus but any mechanical device that tumbles or agitates the article with the liquid treating bath may be used. The amount of the composition should be sufficient to allow free movement of the garment during this impregnation step. This amount is regulated by adjusting the amount of organic liquid in the liquid impregnating composition. Where, for example, the treatment device is a dry cleaning wheel, the quantity of organic liquid may be about five to 20 times the weight of the garment load.

After the article has been sufficiently agitated in the treatment bath, excess liquid is extracted (e.g., in the "spin-drying" cycle of a dry cleaning unit); the article is then dried at a low temperature (e.g., in the drying cycle of a standard dry cleaning unit with the heating coils disconnected), pressed into the desired shape, and cured (e.g., in a walk-in-oven at 300°F). Because the organic liquid in the liquid impregnating composition has a greater rate of evaporation at room temperature than water, excess liquid can be removed from the fabric more quickly than was previously possible using a totally aqueous impregnating composition.

The following examples illustrate several preferred embodiments of the present invention.

EXAMPLE I

The articles treated were 100% cotton fabric swatches weighing 107.2–109.1 g. each. Two swatches were treated in each bath, so the total fabric weight in each bath was 214–218 g. The compositions of treating baths were as follows:

| Bath components | Composition by weight (g.) | | | | | |
|---|---|---|---|---|---|---|
| | I | II | III | IV | V | VI |
| Permafresh 183 (45% active solids) | 33.6 | 33.6 | 33.6 | 33.9 | 33.5 | 338.8 |
| Catalyst X-4 (30% active solids) | 6.0 | 6.0 | 6.0 | 6.1 | 6.0 | 61.0 |
| Mykon SF softener (30% active solids) | 7.2 | 7.2 | 7.2 | 7.3 | 7.2 | 12.3 |
| [Water-supplied in commercial preparations of above and included in total weights above] | 27.7 | 27.7 | 27.7 | 28.0 | 27.7 | 237.8] |
| Added water | 0 | 0 | 13.0 | 26.2 | 38.8 | 813.3 |
| Perchloroethylene | 2,100 | 2,100 | 2,101 | 2,109 | 2,076 | — |
| Atlas G-711 | 31.5 | 31.5 | 31.5 | 31.6 | 31.1 | — |
| Triton X-100 | | | | | | 1.8 |

Permafresh 183 is essentially dimethylol dihydroxyethylene urea; Catalyst X-4 is essentially zinc nitrate; Atlas G-711 is essentially isopropylamine dodecyl benzene sulfonate; Triton X-100 is essentially isooctylphenyl polyethoxy ethanol. Mykon SF is essentially an aqueous emulsion of a low-density polyethylene, containing approximately 30% solids. The treatment was calculated to apply 8% solids before curing, assuming 85% of solids going on the fabrics. The swatches were tumbled 10 minutes in a rotating pipe assembly, and extracted and dried (except No. 1) in an RCA-Whirlpool coin operated drycleaning machine, with the heating coils disconnected so that drying was effected at room temperature. The samples were removed at various time intervals during the drying cycle to determine the amount of liquid remaining in the fabric. The swatches in the first treatment were dried by hanging in the air at room temperature.

Table 1 shows the effect on drying time of additional water added to the aqueous phase of the impregnating composition (the total amount of dissolved solids remaining constant). The usual critical water content is approximately 10–12%, since at this point articles can, practically, be removed from the drying cycle and pressed into the desired shape.

TABLE 1
Drying rates of articles treated with impregnating solutions of varying water content

| Bath | Water content of bath (percent of dry fabric) | | Drying method | Percent volatile (solvent and water) remaining in article after various times (in minutes) spent in standard dry cleaning machine drying cycle | | | | | |
|---|---|---|---|---|---|---|---|---|---|
| | Excess added | Total | | 0 | 2 | 6 | 10 | 20 | 40 |
| I | 0 | 12.8 | Air* | 50 | 40 | 23 | 10 | () | () |
| II | 0 | 12.8 | Tumbled | 49 | 37 | 15 | 7 | 5 | 3 |
| III | 6 | 18.8 | do | 49 | 39 | 18 | 9 | 6 | 4 |
| IV | 12 | 30.8 | do | 52 | 46 | 35 | 24 | 17 | 12 |
| V | 18 | 36.8 | do | 52 | 47 | 37 | 26 | 18 | 13 |
| VI | | 5 fold° | do | 46 | 45 | 44 | 43 | 38 | 28 |

*This one sample was not tumbled but was allowed to dry in air only.
**After 14 minutes, this sample contained only about 2% volatile material, and was removed.
Note.—°No solvent present.

After drying, the articles were heated in an oven at 200°F for 5 minutes, pressed with the Hoffman Hot Head Press for 10 seconds (2 seconds steaming, 8 seconds baking), and cured in an oven at 300°F for 8 minutes.

Table 2 shows certain condition factors, specifically, the amount of solid add-on and the crease recovery angle. The degree of mussiness was also examined after each article was removed from the drying cycle; this is an important factor because the articles, when first removed, must be hand pressed into the desired shape prior to making this shape permanent in the curing process. It was found that, although the "12.8-tumbled" sample was mussiest, all of the other samples treated with the multi-phase composition were of a lesser average degree of mussiness, and the addition of water seemed to have no effect thereon. A below average degree of mussiness was, however, exhibited by the cloth treated in totally aqueous solution.

TABLE 2
Effect of water content bath on add-on and crease recovery angle

| Bath | Water content of bath (percent of dry fabric) | | Drying method | Add-on¹ (percent solids by wt. of dry fabric) | Crease recovery angle (Monsanto test**) |
|---|---|---|---|---|---|
| | Excess added | Total | | | |
| I | 0 | 12.8 | Air* | 7.7-8.6 | 303-309 |
| II | 0 | 12.8 | Tumbled | 8.1-8.8 | 296-302 |
| III | 6 | 18.8 | do | 8.0-8.2 | 295-302 |
| IV | 12 | 30.8 | do | 8.0-8.0 | 297-298 |
| V | 18 | 36.8 | do | 7.9-8.2 | 298-300 |
| VI | | 5 fold° | do | 8.5-8.8 | 301-303 |

¹ After drying, before curing.
*This one sample was not tumbled but was allowed to dry in air only.
**AATCC-66-1959T tenative test method (identical with ASTM D 1295-60T test and the American Standards Assoc. Method ASA No. L 14.110-1961).
Note—°No solvent present.

EXAMPLE 2

The article to be treated consisted of 100% cotton trousers, sanforized, weighing 560 gm. (Sears, Roebuck Company); they were army twill, 8.5 oz. per square yard, single ply yarns, vat dyed. The impregnating composition in the treating bath (calculated to apply 6% resin solids to fabric), consisted of the following:

88 g. of Permafresh 183 (45% active solids)
16 g. of Catalyst X-4 (30% active solids)
11.6 g. of Mykon SF polyethylene softener (30% active solids)
5,600 g. of Perchloroethylene
56 g. of Atlas G-711 (in 30 g. of Perchloroethylene)

The amount of water in the aqueous phase was approximately 68 g., being supplied as a part of the Permafresh, Catalyst X-4, and Mykon ingredients.

An aqueous resin bath calculated to apply the same resin would have to contain:

875 g. of Permafresh 183 (45% active solids)
157 g. of Catalyst X-4 (30% active solids)
4.7 g. of Triton X-100 (100% active solids)
131 g. of Mykon SF (30% active solids)
2,100 g. of Water Four identical pairs of trousers were treated separately with each resin bath by tumbling for 10 minutes in a rotating pipe assembly (6 inches in diameter, 36 inches long) having a capacity of about 6 liters, and making 30 revolutions per minute. Except that the multi-phase impregnating composition was tumbled for 2 minutes prior to receiving the trousers, in order to mix the two liquid phases, the same procedure was used to treat the pants with both the multi-phase and the aqueous treating baths. After treatment, the trousers were extracted and dried in an RCA Whirlpool coin-operated drycleaning unit (Model GLC-50) in the dry-deodorize cycle with the heating coils disconnected. The trousers treated in the multi-phase bath were dried for 30 minutes. After drying overnight, the garments were oven dried at 200°F for 5 minutes, conditioned, and weighed to determine resin add-ons. The add-ons were 5.4, 5.5 5.4, and 5.4%. That the add-on was less than that calculated is due to the slight solubility of resin in perchloroethylene. When the same resin saturated perchloroethylene is recharged with a fresh aqueous solution, a larger proportion of resin goes into the fabric, generally 95% or more.

EXAMPLE 3

The article to be treated consisted of poplin (65% polyester, 35% cotton, weighing 4.6 oz./square yard) swatches weighing 31.7 g. The treating bath consisted of the following:

8.8 g. Permafresh 183 (45% active solids)
1.5 g. Catalyst X-4 (30% active solids)
314 g. Varsol
3.1 g. Atlas G-711

The aqueous phase contained approximately 5.9 g. of water. The liquid impregnating composition was tumbled 1 minute and the fabrics for 3 minutes in a tumble jar (AATCC 70B-1964 Dynamic absorption tester). The fabrics were extracted and dried. The resin add-on was 6.9% solids.

EXAMPLE 4

The fabric treated was of 100% cotton, and each piece weighed 46.8 g. The treatment bath, which this time contained a lesser amount of water, consisted of:

3.1 g. Permafresh 183 (90% active solids)
1.3 g. Catalyst X-4 (30% active solids)
456 g. Perchloroethylene containing 4.7 g. of Atlas G-11.

The amount of water here was approximately 1.2 g.

After the same treatment as in Example 2, the resin add-on was 6.0%.

EXAMPLE 5

Three separate treatment baths were prepared, to measure the precision to which add-on could be controlled, as well as the effects of softener and emulsifier thereon. Four pieces of 100% cotton fabric were treated simultaneously in the same tumble jar according to the procedure in Example 3. Table 3 shows the results. The treatment baths were constituted as follows:

BATH A: 6.1 g. Permafresh 183 (45% active solids)
1.1 g. Catalyst X–4 (30% active solids)
0.8 g. Mykon SF (30% active solids)
456 g. Perchloroethylene
5.0 g. Atlas G-11
(containing about 4.7 g. water)

BATH B: 6.1 g. Permafresh 183 (45% active solids)
1.2 g. Catalyst X–4 (30% active solids)
456 g. Perchloroethylene (containing about 4.2 g. water)

BATH C. 6.1 g. Permafresh 183 (45% active solids)
1.1 g. Catalyst X–4 (30% active solids)
0.8 g. Mykon SF (30% active solids)
456 g. Perchloroethylene (containing about 4.7 g. water)

TABLE 3

Effect of Softener and Emulsifier on Solids Add-on

Solids Add-on [% solids by weight of dry fabric]

| Bath A (Atlas G-711 and Mykon SF) | Bath B (No Atlas G-711 No Mykon SF) | Bath C (No Atlas G-711 with Mykon SF) |
| --- | --- | --- |
| 6.7% | 4.6% | 7.6% |
| 6.5 | 3.2 | 5.8 |
| 6.2 | 9.0 | 5.3 |
| 6.7 | 5.5 | 6.3 |

The process described in the above preferred embodiments provides a practical means of imparting a permanent press to individual garments. For example, the entire process may be carried out in a dry cleaning machine, the garments being tumbled therein with the liquid impregnating composition until saturated, centrifuged to separate the major portion of organic liquid, and dried in the drying cycle of the same machine. Room temperature air may be blown through the load while tumbling, and the organic solvent vaporized therein may be readily recovered for reuse by passing the solvent-laden air over a series of cooling coils. The garments, when dry, are pressed into shape and hot-pressed.

Although the process is especially useful in the custom shaping of permanent press garments (presently, permanent press suits are difficult to alter because creases are already set in at the factory), the use of the process need not, however, be thus confined. The process is equally applicable to any article made from fabric containing hydrophilic textile fiber, such as draperies, tablecloths, sheets, pillowcases, aprons, bedspreads, napkins to which it is desired to impart a permanent press.

What is claimed is:

1. In a method of providing a permanent crease in an article made of fabric containing hydrophilic textile fibers comprising impregnating the article with a water solution of a water-soluble methylol aminoplast thermosetting resin curable to provide press characteristics in articles and a water-soluble catalyst therefor, drying, pressing the article into the desired shape, and hot pressing, the improvement which comprises impregnating by bringing the article into contact with a liquid medium comprising at least two phases containing droplets of said resin-containing water solution dispersed in a water immiscible organic liquid having a rate of evaporation at room temperature greater than that of water, the amount of said water solution being at least equal to the natural moisture regain of the hydrophilic fibers in said article, and the volume of said organic liquid being at least twice the volume of said water solution.

2. The process described in claim 1 wherein said organic liquid is perchloroethylene.

3. The process described in claim 1 wherein said liquid medium contains an organic emulsifying agent, selected from the group consisting of petroleum sulfonates, long-chain ethoxylated phosphate esters, sodium sulfosuccinates, amine alkylarene sulfonates, ethoxylated alkanolamides, ethoxylated phenols, soap-fatty acid mixtures, and fatty acid esters of sorbitan.

4. In a method of treating a fabric containing hydrophilic textile fibers to render it capable of taking a permanent press, by impregnating the fabric with a water solution of a water-soluble methylol aminoplast thermosetting resin curable to provide permanent press characteristics in fabric and a water soluble catalyst therefor the improvement which comprises impregnating by bringing the fabric into contact with a liquid medium comprising at least two phases containing droplets of said resin-containing water solution dispersed in a water immiscible organic liquid having a rate of evaporation at room temperature greater than that of water, the amount of water being at least equal to the natural moisture regain of the hydrophilic fibers in said fabric, and the volume of said organic liquid being at least twice the volume of said water solution.

5. An agent for the crease proofing of textiles containing at least partly cellulose fibers, said agent comprising a mixture of (1) 25 to 44 parts by weight of a water soluble methylol compounds of urea or cyclic alkylene urea with more than 1.5 methylol groups per mol, 37 to 65 parts by weight of water and 20 to 35 parts by weight of an emulsifying agent soluble in hydrocarbons or chlorinated hydrocarbons which is miscible with the methylol compound and having an HLB index of 7 to 11 and (2) at least 50 percent of an organic water insoluble solvent.

6. An agent in accordance with claim 1, wherein the methylol groups of said methylol compound are alkoxylated by monovalent saturated alcohols with one to five carbon atoms.

7. An agent in accordance with claim 1, wherein said HLB index is from 7 to 8.5.

8. An agent in accordance with claim 1, wherein said methylol compound is derived from cyclic alkylene ureas with five- to six-membered rings.

9. A process for crease proofing textiles containing at least partly cellulose fibers with N-methylol compounds of amino-plast forming product in organic solvents by the addition of an acid or an acid-forming catalyst and an emulsifying agent, which comprises saturating the textiles with opalescent or finely dispersed stable diluted water-in-oil emulsions consisting of a mixture of 25 to 44 parts by weight of a water soluble methylol compound of urea or cyclic alkylene urea with more than 1.5 methylol groups per mol, 20 to 35 parts by weight of an emulsifying agent soluble in hydrocarbons or chlorinated hydrocarbons which is miscible with the methylol compound and having an HLB index of 7 to 11 and 37 to 65 parts by weight of water; 11 to 14 percent by weight of a hardening catalyst referred to the methylol compound and hydrocarbons or chlorinated hydrocarbons, the finishing bath containing at least 50 percent of said organic water insoluble solvent, and then drying the textiles.

10. A process in accordance with claim 6, wherein said catalyst is a hardening catalyst consisting of a zinc salt or magnesium salt of a strong acid.

11. A textile containing at least partly cellulose or regenerated cellulose fibers and treated by the process of claim 1.

* * * * *

PO-1050
(5/69)

UNITED STATES PATENT OFFICE
CERTIFICATE OF CORRECTION

Patent No. 3,771,950     Dated November 13, 1973

Inventor(s) Anthony Max Schwartz and Julian Berch

It is certified that error appears in the above-identified patent and that said Letters Patent are hereby corrected as shown below:

Under References Cited:

"1,361,277" should read --2,361,277--.

Signed and sealed this 23rd day of April 1974.

(SEAL)
Attest:

EDWARD M. FLETCHER, JR.
Attesting Officer

C. MARSHALL DANN
Commissioner of Patents